March 18, 1969 J. W. DAWSON 3,434,108
AUTOMOBILE SIGNAL
Filed Oct. 10, 1966
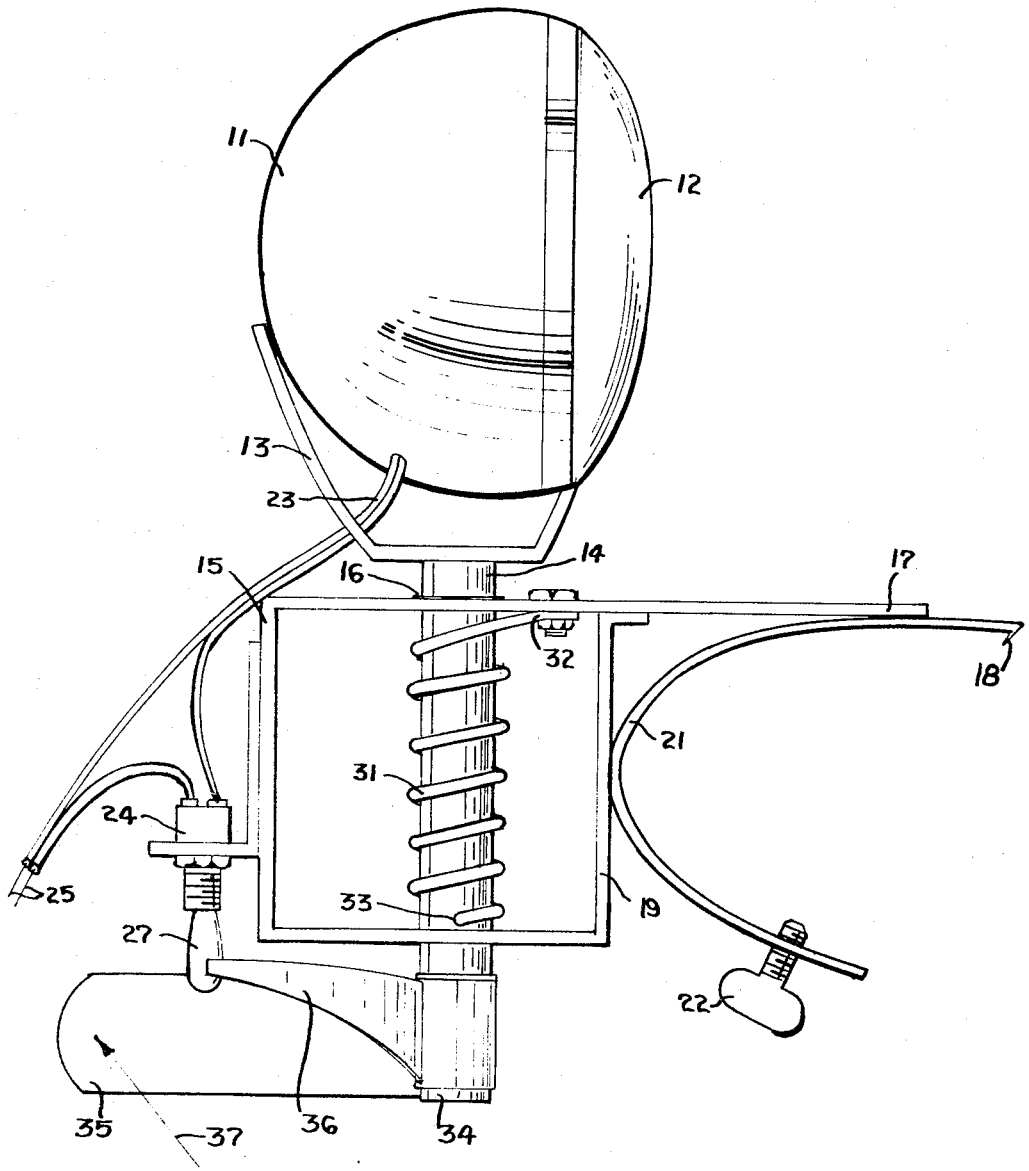
INVENTOR.
BY JOHN W. DAWSON
Russell, Chittick & Pfund United States Patent Office 3,434,108
Patented Mar. 18, 1969

3,434,108
AUTOMOBILE SIGNAL
John W. Dawson, Norwell, Mass., assignor to
Charles E. Pfund, Newton, Mass.
Filed Oct. 10, 1966, Ser. No. 585,467
U.S. Cl. 340—74                                    2 Claims
Int. Cl. B60q 1/26, 1/46

ABSTRACT OF THE DISCLOSURE

An automobile signal light provides a transient signal cycle which sweeps a narrow light beam through a small angle during which the light is energized and after which the light is extinguished. In the mechanical embodiment shown the focused beam lamp is mounted on a vertical axis and can be rotated by the driver away from the rest position and released for spring return. An electric switch for energizing the lamp is actuated by the motion to turn the lamp on and off at the limits of travel.

---

This invention relates generally to automobile signalling lights and more particularly to a simple, effective and economical light warning signal.

The principal object of the invention is to provide a simple and economical automobile signal light which can be selectively operated by the driver of an automobile to produce a warning signal to traffic which is ahead of the automobile. For this purpose, it is necessary to generate a high intensity light flash which does not produce a blinding effect with respect to oncoming traffic and which is transient in nature so as not to provide a continuous flashing signal that would be confused with the flashing signal lights associated with emergency vehicles. The present invention accomplishes this objective by providing a high intensity sharply focused pencil light beam which can be swept through a limited angle in a horizontal plane to be directed at the traffic area ahead of the vehicle in which it is installed and which has a transient cycle for the operation so that only a brief flashing signal is achieved each time the device is operated by the driver and which terminates at the end of the cycle.

The general objectives of the present invention are accordingly similar to those found in the co-pending application of the assignee of the present application filed concurrently herewith, Ser. No. 585,386.

The single figure of the drawings shows a side elevation of one embodiment of the invention adapted for attachment to the dashboard of an automobile with a light beam projected forwardly through the windshield of the automobile.

Referring now to the drawing, the invention is seen to comprise a lamp housing 11, which may be a conventional sealed beam unit having a transparent lens 12 through which a sharply focused pencil beam is projected whenever the incandescent lamp within the housing 11 is energized. The housing 11 is supported on a bracket 13 which is mounted on a vertical rod 14 which is journalled for rotation in a rectangular frame 15. The rod 14 may have fixed thereto a flange 16 which beams on the upper surface of the frame 15 and supports the weight of the lamp housing 11.

The frame 15 has a horizontal forward extension 17 that terminates in a downward projecting set of teeth 18 capable of piercing the foam plastic surface of an automobile dashboard. Attached to the undersurface of the frame extension 17 and a vertical extension 19 is a curved plate 21 which generally fits the curved contour of a padded dashboard. Threaded through the curved plate 21 is a thumb screw 22 by which the apparatus can be mounted to a padded dashboard by pressing the teeth 18 into the top surface of the dashboard foam material and tightening the thumb screw 22 to obtain a clamping action.

The lamp inside the housing 11 is energized through a lead 23 which is interrupted by a switch 24 and has end terminals 25 which are ultimately connected to the automobile electrical power source. The switch 25 is a conventional bat-handled toggle having an actuating extension 27 depending generally parallel to the frame member 15 and the axis of rotation of the rod 14. The toggle switch 25 is actuated to be either open or closed and when actuated to one position or the other remains in that condition until an opposite actuating force returns it to its opposite position. For this purpose the bat-handle extension actuator 27 operates in a plane substantially perpendicular to the plane of the drawing.

The lamp housing 11 has a normal at rest position which is approximately straight ahead through the windshield of the automobile when the bracket 21 is mounted in a central position on the dashboard of the automobile. This at rest position is determined by the set of a helical spring 31 which is secured to the frame 15 at 32 and the other end of which is secured to the rod 14 at 33. The lamp housing can be rotated by rotating the rod 14 in its bearings in the frame 15 and in so doing the spring 31 is wound or unwound depending upon the sense of the rotation and in any event supplies a restoring force which, when the deflection force is released, returns the rod 14 and the housing 11 to the at rest position previously described.

At the bottom of the rod 14 an extension 34 supports a horizontally extending manual deflector bar 35 and a curved switch actuator arm 36. For the at rest position of the housing 11 neither the deflector bar 35 or the switch actuator arm 36 touches the bat-handle extension 27, but the angular spacing between the members 35 and 36 is such that each member can actuate the bat-handle 27 for approximately equal and opposite rotations of the housing 11 on rod 14. This angular deflection which is necessary in order for the members 35 or 36 to operate the switch 25 occurs for example at 20° on either side of the at rest position for the rod 14. The normally open condition for switch 25 is with the actuator 27 deflected out of the plane of the drawing.

The operation of the device will now be described in which a transient light beam is achieved which sweeps the traffic area ahead of the automobile in which the device is installed. As indicated, the screw 22 is used to mount the device on the padded dashboard with the teeth 18 being pressed in to penetrate the foam top surface of the padded dash and support the entire unit in a manner to project the beam through the lens 12 and windshield substantially horizontally. The leads 26 are connected to the automobile battery and the device is ready to operate. The normal position of the actuator 27 is with the switch 24 off and the lamp in the housing 11 is normally de-energized. When the driver wishes to signal to adjacent traffic he uses his forefinger to apply a deflecting force to the front surface of the deflector bar 35 as indicated by the arrow 37. This rotates the rod 14 and the housing 11 in a clockwise direction when viewed from above to a point where the actuator 27 is deflected into the plane of the paper by the curved arm 36 and the toggle switch 25 is closed. This energizes the lamp in housing 11 to project the pencil beam through the lens 12 in the deflected position of the housing 11. The driver then releases the force supplied to the front side of the bar 35 and the winding force of the spring 31 rotates the rotatable portion of the unit in a counterclockwise direction viewed from above and the inertia of the mass carries the housing 11 past its at rest position a sufficient distance so that the deflector bar 35 contacts the actuator arm 27. The unit has sufficient momentum to actuate the toggle and turn the switch 25 off. The restoring force of the spring 31 reverses the rotation and the unit oscillates briefly until its at rest position is assumed without however providing sufficient oscillatory deflection to again operate the actuator 27 of switch 25. Thus a single sweeping beam is achieved each time the driver uses his hand to deflect the bar 35 momentarily and releases the same as soon as the manual deflection has proceeded far enough to actuate the extension 27 to turn the switch 25 on. Once released the sweeping of the light beam through the desired horizontal angle and the turning off of the same is achieved automatically and the unit returns to its at rest position where it is ready for a subsequent actuation by the driver.

While a simple manually operated device has been disclosed, it will be apparent that other arrangements for achieving a transient sweeping intense light beam as a selectively operable signal may be used without departing from the spirit and scope of the invention.

I claim:

1. A warning light signalling device for an automobile comprising a normally de-energized light source, a reflector for concentrating light from said source to produce a narrow beam, means for mounting said device on an automobile in a position to project said beam substantially horizontally ahead of said automobile, means selectively operable by the driver of said automobile for initiating a transient cycle that automatically terminates, and means responsive to said selectively operable means including means for energizing said light source, means for rotating said narrow beam through a limited substantially horizontal angle while said light source is energized, and means for de-energizing said light source after said rotating thereby to scan the traffic area ahead of said automobile during said transient cycle with a transient scanning light beam that appears as a brief flash at the individual azimuth angles within said horizontal angle.

2. A warning light signalling device for an automobile comprising a normally de-energized spotlight mounted for rotation on a substantially vertical axis with the beam thereof directed substantially horizontally, manually operable means for initiating a transient cycle by rotating said spotlight through a limited angle of rotation, spring means for returning said spotlight to a normal at rest position after said rotating, and switch means operable by said rotating and returning to turn said spotlight on and off respectively.

References Cited

UNITED STATES PATENTS

| | | | |
|---|---|---|---|
| 1,704,117 | 3/1929 | Anderson | 240—48 X |
| 2,572,439 | 10/1951 | Brozier | 340—50 |
| 2,852,759 | 9/1958 | Mas | 340—49 |
| 3,278,895 | 10/1966 | Pfund | 340—34 |

EUGENE G. BOTZ, *Primary Examiner.*

U.S. Cl. X.R.

240—48; 340—84, 92, 138